Figure 1:
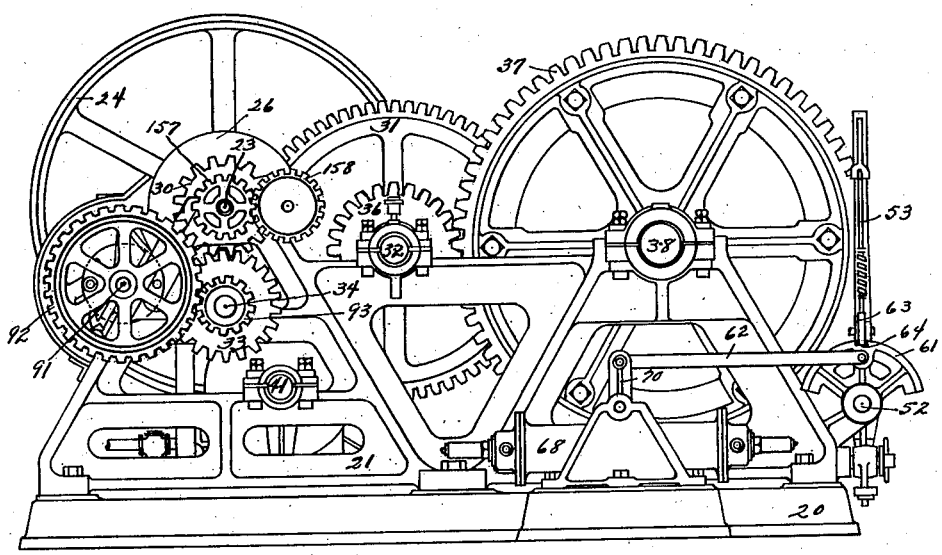

June 24, 1930.   F. N. WHITESELL   1,766,236
AUTOMATIC HOISTING APPARATUS
Filed Nov. 6, 1926    8 Sheets-Sheet 1

INVENTOR
FREDERICK N. WHITESELL
BY Roy M. Eilers
ATTORNEY

June 24, 1930. F. N. WHITESELL 1,766,236
AUTOMATIC HOISTING APPARATUS
Filed Nov. 6, 1926 8 Sheets-Sheet 2
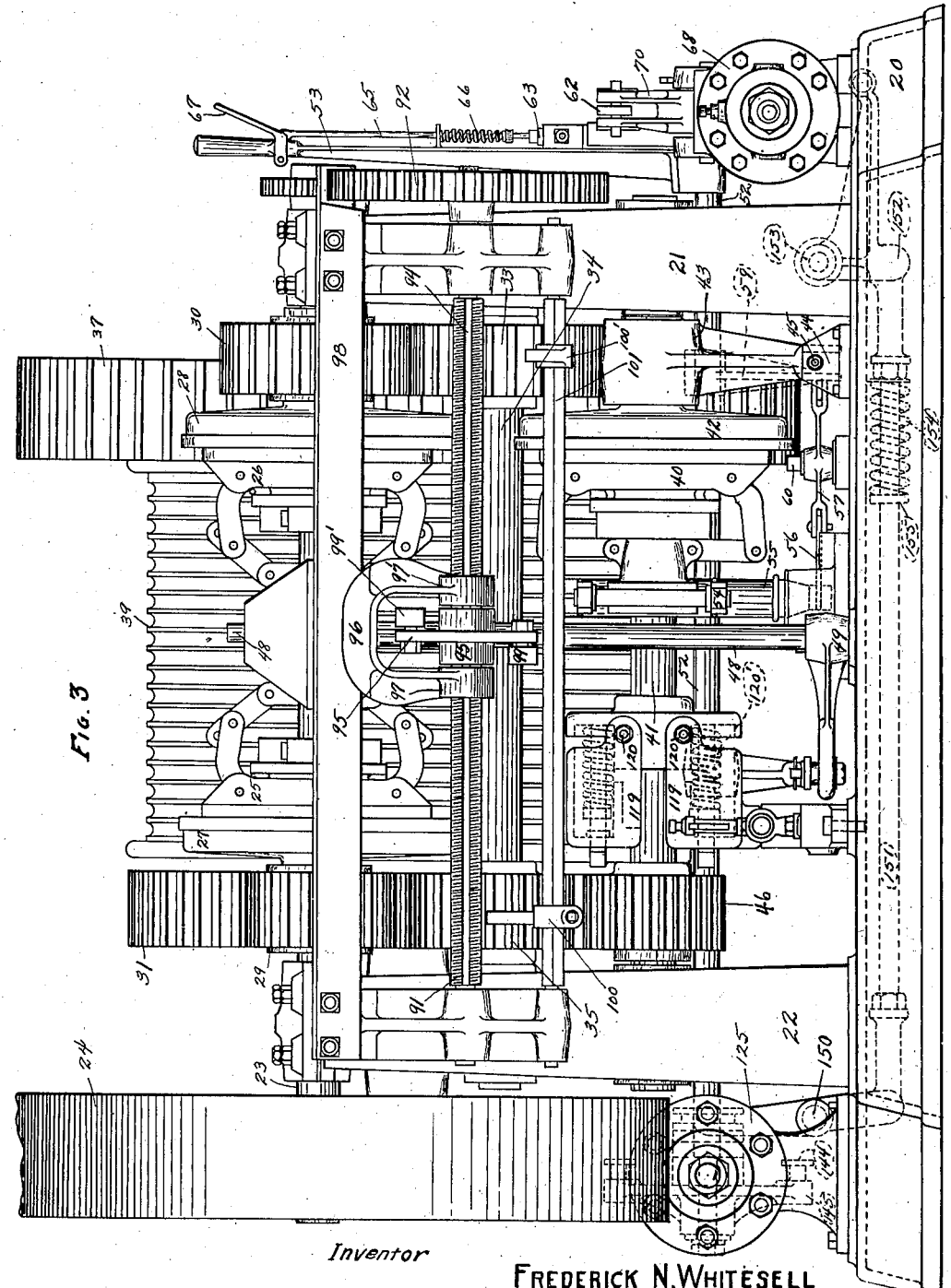
Inventor
FREDERICK N. WHITESELL
BY Roy M. Eiler
ATTORNEY

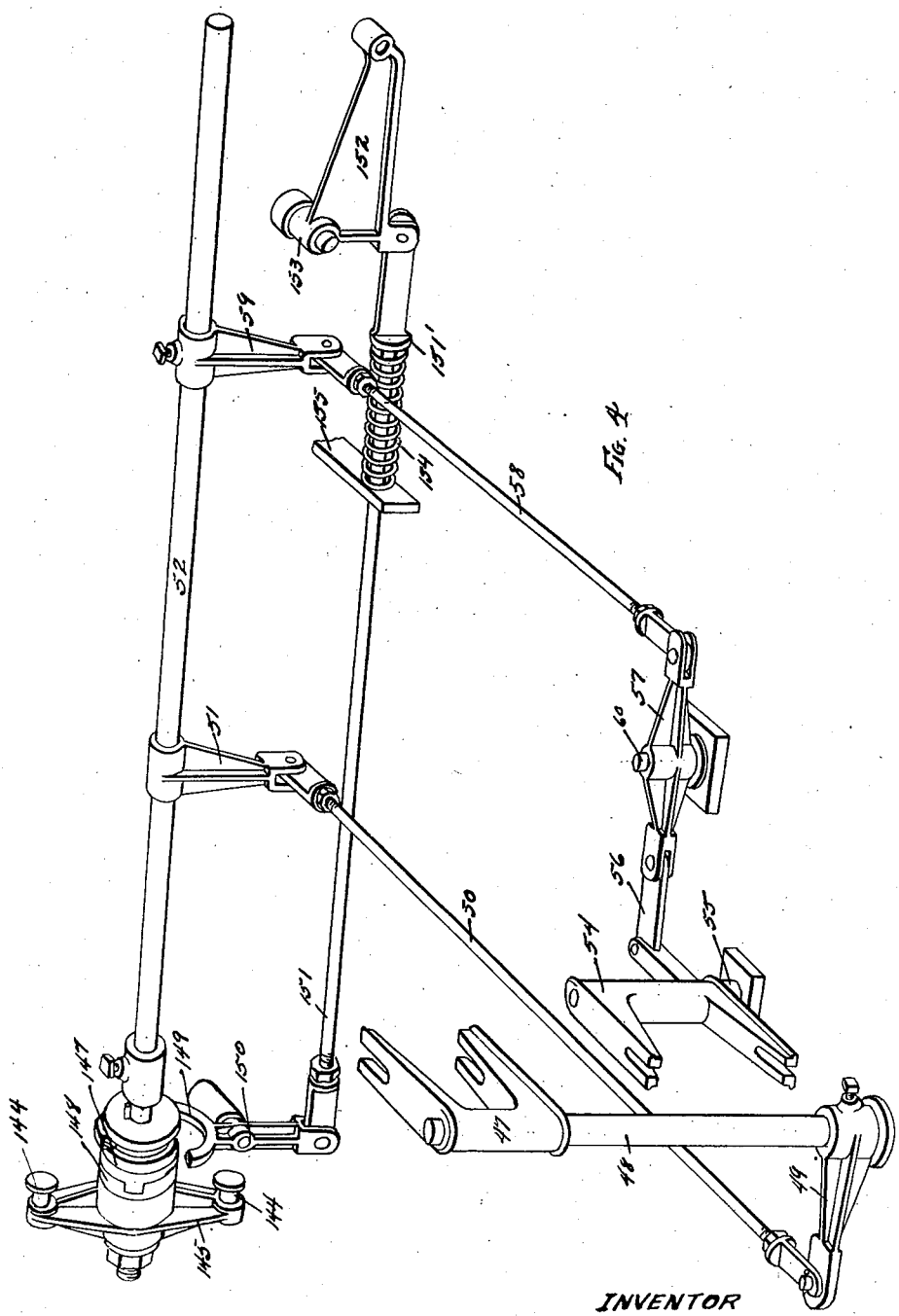

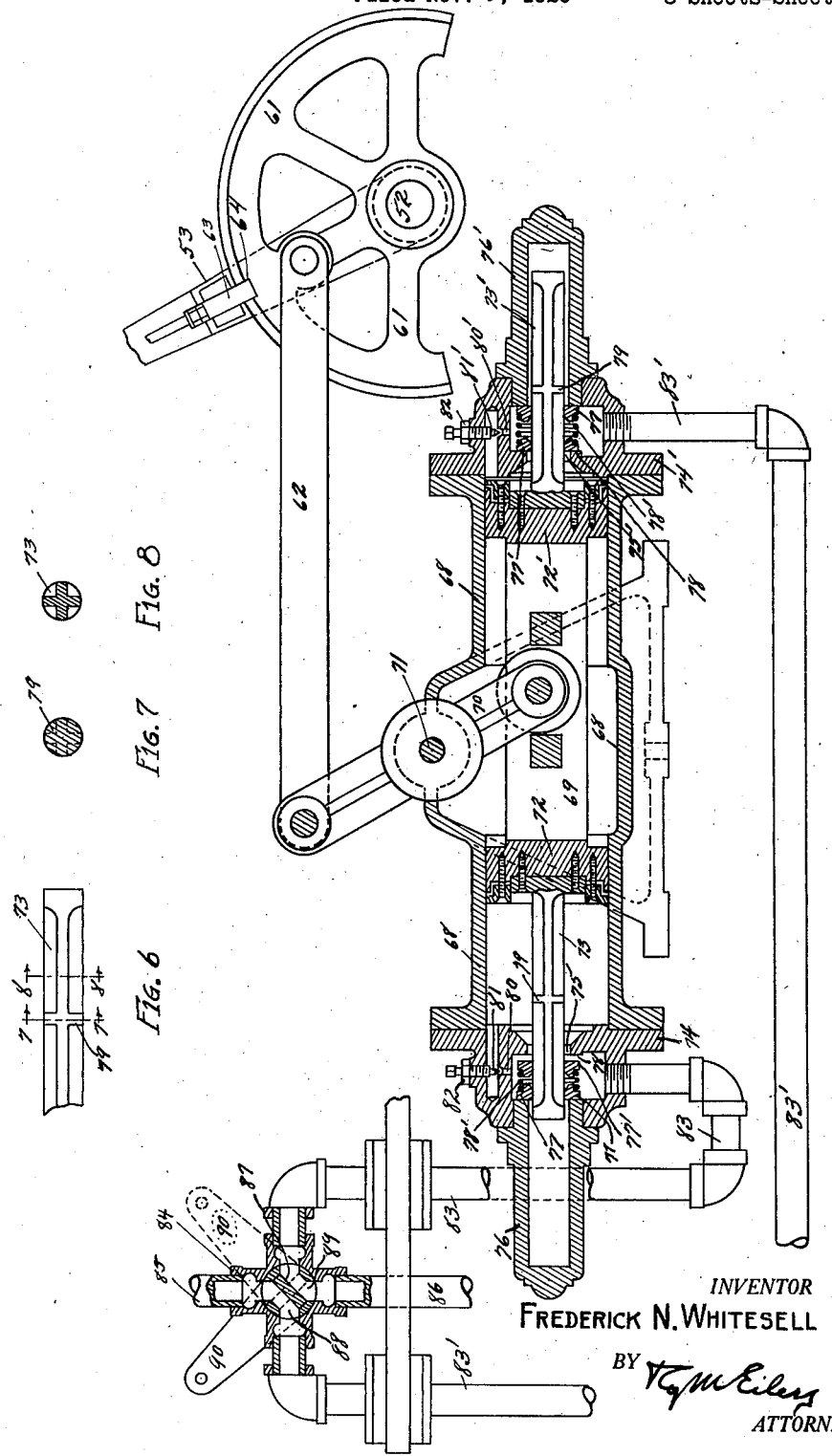

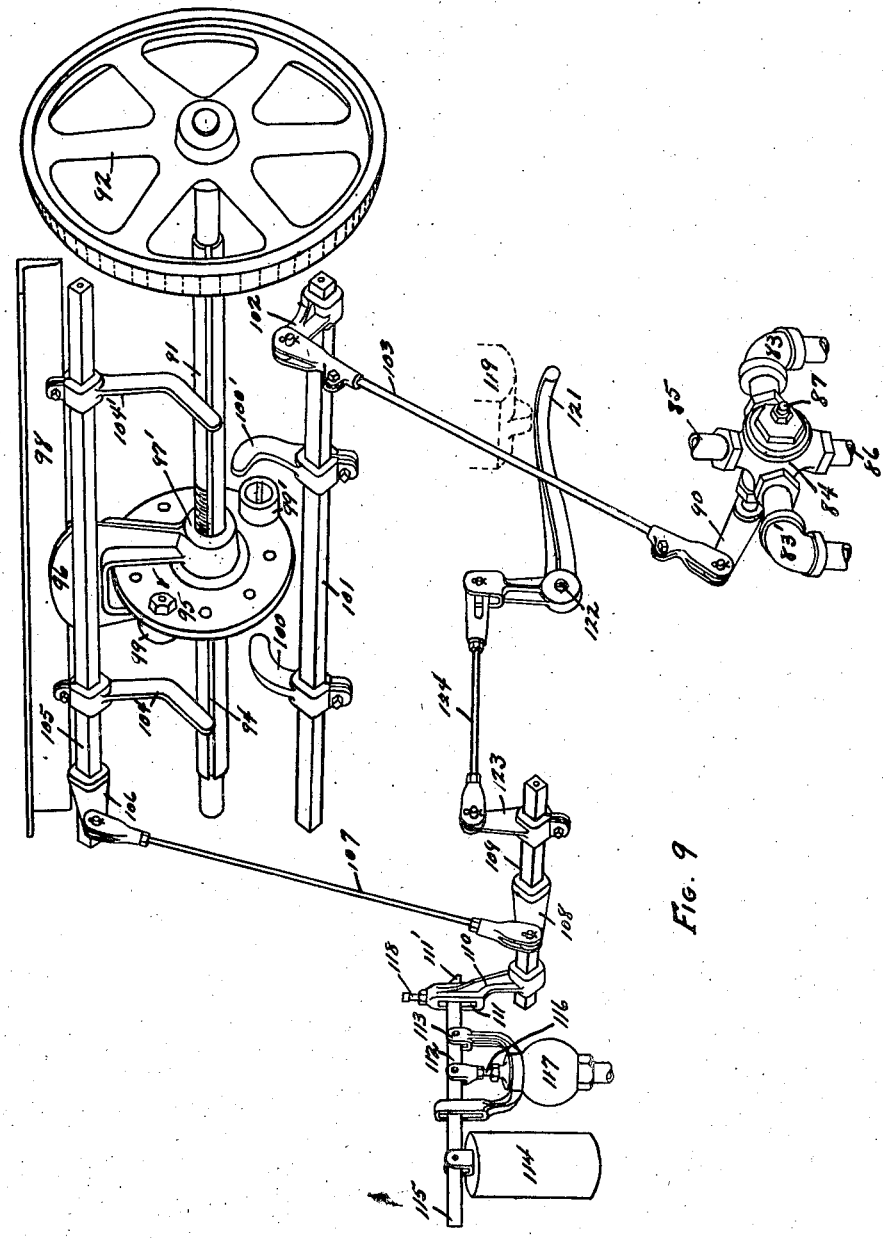

June 24, 1930.  F. N. WHITESELL  1,766,236
AUTOMATIC HOISTING APPARATUS
Filed Nov. 6, 1926   8 Sheets-Sheet 6
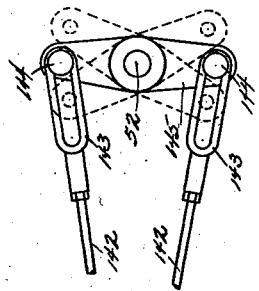
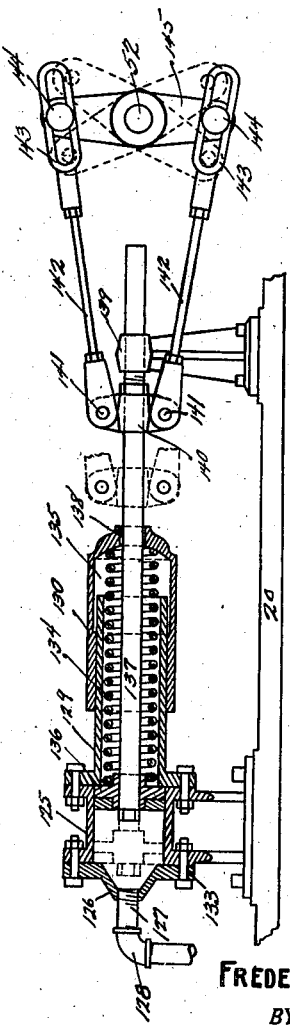
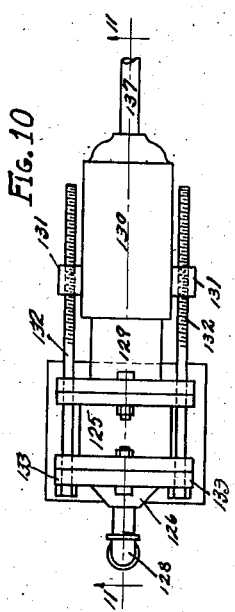
INVENTOR
FREDERICK N. WHITESELL
BY Roy M. Eilers
ATTORNEY

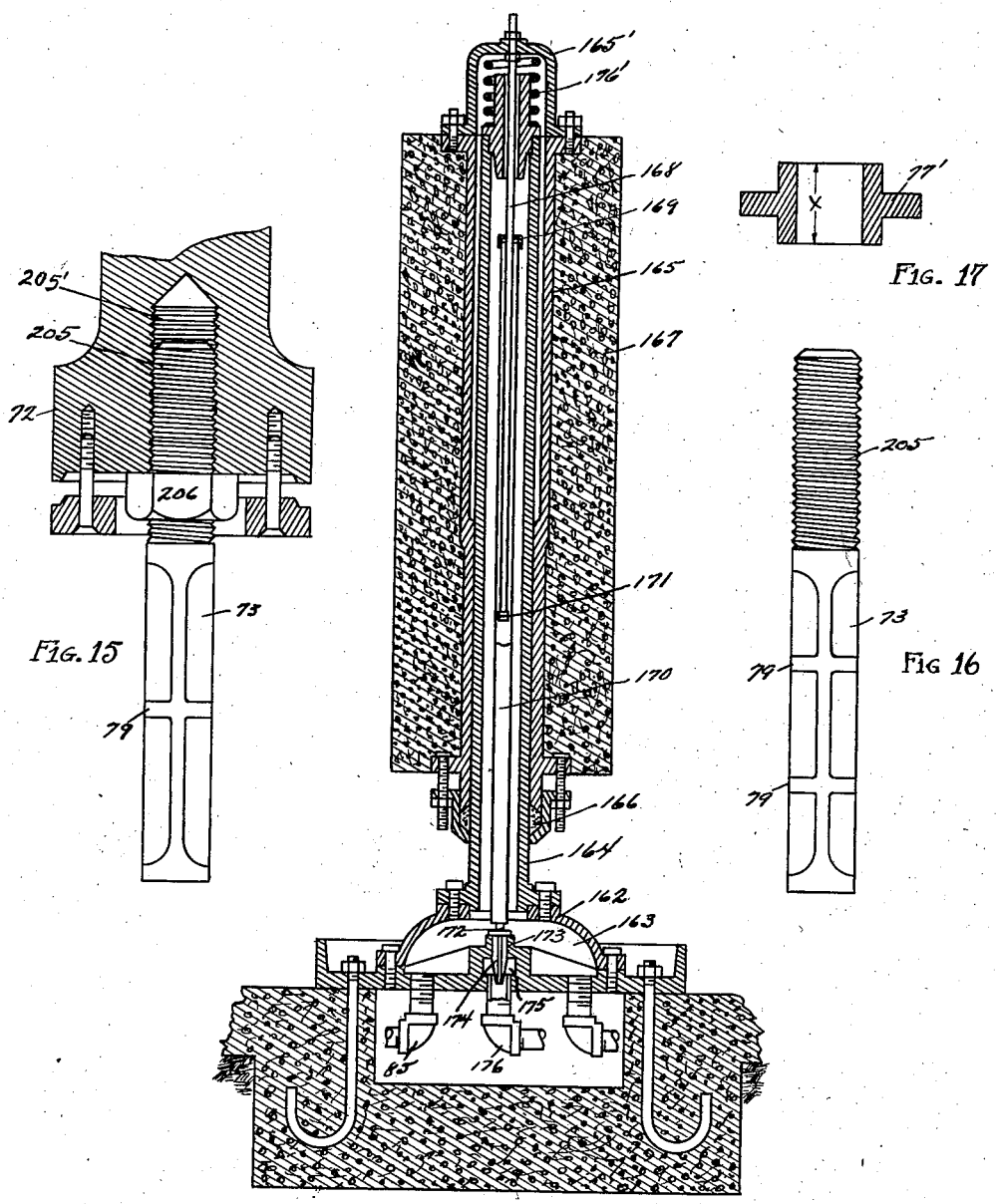

Patented June 24, 1930

1,766,236

UNITED STATES PATENT OFFICE

FREDERICK N. WHITESELL, OF CHICAGO, ILLINOIS, ASSIGNOR TO FAIRBANKS, MORSE & CO., OF CHICAGO, ILLINOIS, A CORPORATION OF ILLINOIS

AUTOMATIC HOISTING APPARATUS

Application filed November 6, 1926. Serial No. 146,720.

My invention relates to improvements in hoisting apparatus and more particularly to hoisting apparatus of the drum type in which the operation of the winding drum is adapted to be controlled automatically.

Apparatus of this type is generally employed to elevate material such as coal, sand, or the like, by means of buckets or skips from a loading point to an upper storage bin. One of the objects of my device is to provide automatic hydraulic means for controlling the winding drum of such types of hoists, whereby the bucket or skip will be hauled up to the storage bin, dumped, lowered to the loading hopper and started on its upward trip again without any attention from the attendant.

Another object of my device is to provide automatic hydraulic controlling means for a drum hoist which provides maximum safety in operation and which has means in operation therewith for automatically stopping the drum in case the regular cycle of operations is interrupted or interfered with for any cause.

Another object of my invention is to provide in an apparatus of the class described, a novel clutching mechanism whereby a brake clutch is provided which is automatically set whenever power is removed from the drum, but which is automatically released whenever the drum is revolved in either direction by the prime mover.

Another object of my invention is to provide means whereby the hoisting mechanism is automatically stopped whenever the pressure in the hydraulic system is lowered beyond a pre-determined value by any cause.

Another object of my invention is to provide, in a hoisting mechanism of the class described, a control cylinder and piston having means for retarding the action of the piston for any pre-determined length of time and at any pre-determined position of the piston.

Further objects and advantages of my invention will appear from the following drawings and descriptions thereof.

Although my invention consists largely in the construction and arrangement of parts hereinafter described and particularly pointed out in the claims, yet I do not limit my invention to the precise form or construction of parts shown or the several parts thereof, inasmuch as various alterations may be made without changing the scope of my invention.

Figure 2:
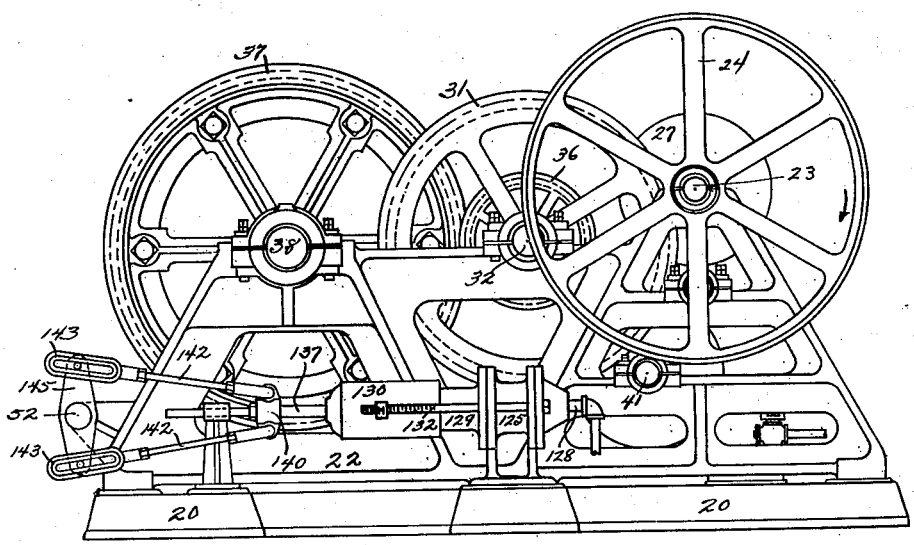
Figure 13:
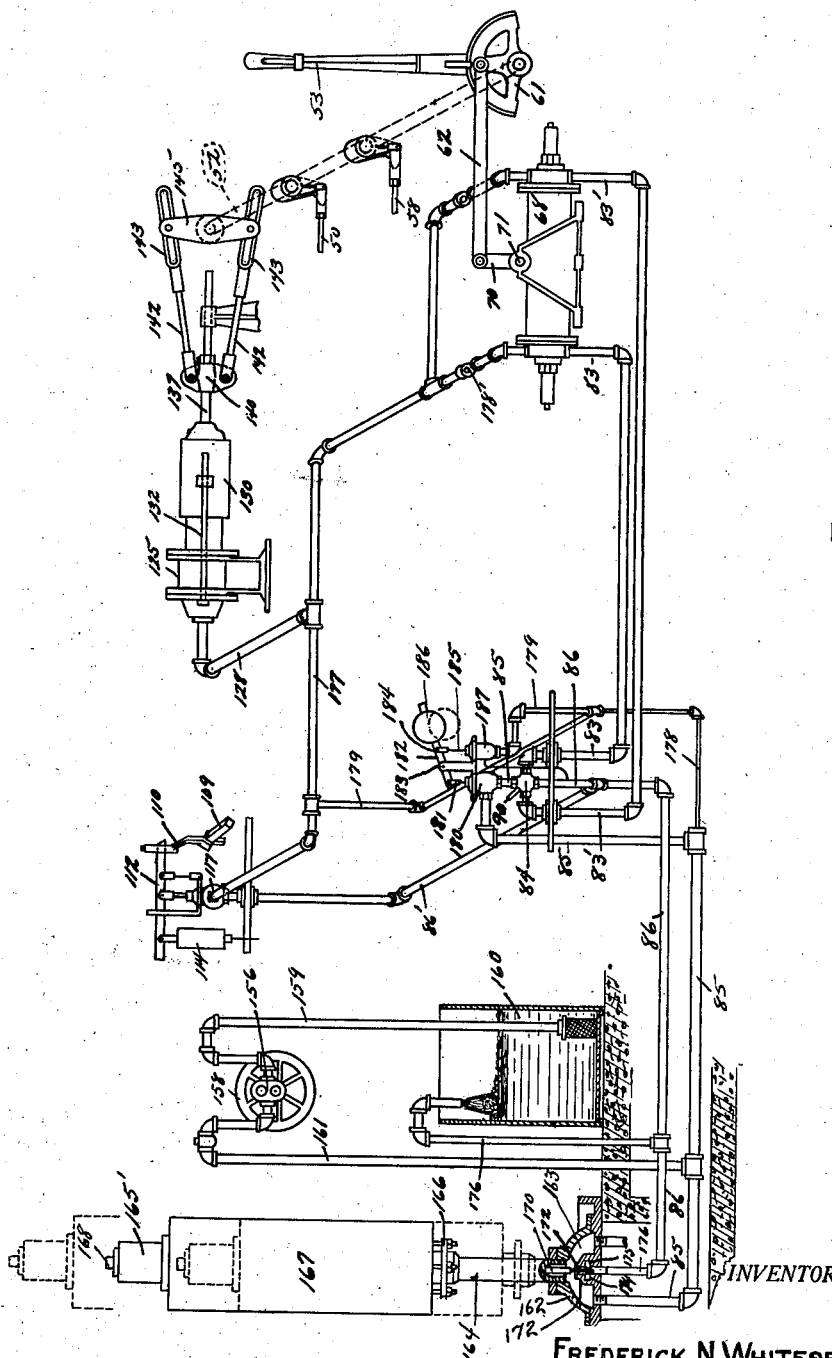

In the drawings Figs. 1 and 2 are side elevations, from opposite sides, of an approved form of my device, Fig. 3 is an end elevation of my device slightly enlarged with respect to Figs. 1 and 2; Fig. 4 is a perspective view of an approved arrangement of my clutch operating mechanism; Fig. 5 is a detail elevation of an approved form of my hydraulic operating cylinder and valve partially in section; Fig. 6 is a fragmentary detail view of an approved form of my control piston valve stem; Fig. 7 is a sectional view taken along the line 7—7 in Fig. 6; Fig. 8 is a sectional view taken along the line 8—3 in Fig. 6; Fig. 9 is a perspective view of an approved form of my automatic controlling mechanism and safety device; Fig. 10 is a plan view of an approved form of my safety cylinder; Fig. 11 is a sectional elevation taken along the line 11—11 in Fig. 10 and showing, in addition, the safety control rods and lever; Fig. 12 is a fragmentary view of my safety control rods and lever shown in Fig. 11, but shown set in neutral position; Fig. 13 is a diagrammatic view of an approved form of my hydraulic system; Fig. 14 is a sectional elevation of an approved form of my pressure accumulator; Fig. 15 is a fragmentary sectional elevation of a modified form of my valve stem and operating piston; Fig. 16 is an elevational view of a modified form of my valve stem; and Fig. 17 is a sectional elevation of a modified form of my valve ring.

Referring by numerals to the drawings, 20 designates the base of my device, preferably having attached thereto in any suitable manner, side frame members 21 and 22. Suitably journaled in the frame members is a driving shaft 23, carrying drive-pulley 24, and preferably having slidable clutch members 25 and 26 slidably keyed thereto so as to rotate with said shaft but capable of lateral movement with respect thereto. Rotatable clutch members 27 and 28 are preferably rotatably mounted on shaft 23 and adapted to co-act with clutch members 25 and 26 respectively. The clutch members 27 and 28 preferably carry pinions 29 and 30, respectively. Pinion 29 is adapted to mesh with gear 31 on intermediate shaft 32 journaled in side frames 21 and 22. Pinion 30 is adapted to mesh with gear 33 on reverse shaft 34. Pinion 35 on shaft 34 preferably meshes with gear 31 on intermediate shaft 32. Pinion 36 is preferably provided on shaft 32 meshing with drum gear 37 on drum shaft 38 and attached in any suitable manner to winding drum 39.

The slidable clutch members 25 and 26 are preferably connected together and operated by means of a common clutch sleeve of any suitable type (not shown) sliding on drive shaft 23, and the clutches are preferably so adjusted that when one clutch is engaged the other clutch will be disengaged. As shown in Fig. 3, the driving clutches are in neutral position and if the clutch sleeve is moved to the left, in Fig. 3, so that clutch member 25 engages with its co-acting member 27, power will be transmitted from drive shaft 23 through pinion 29 to intermediate gear 31, and from thence through pinion 36 and gear 37 to drum 39, and the drum will be revolved in the same direction of rotation as the driving shaft. If now the direction of rotation of the driving shaft remains the same, as it does in practice, and the clutch collar is moved to the right in Fig. 3, clutch member 25 is disengaged from its co-acting member 27 and clutch member 26 is engaged with its co-acting member 28 so as to drive intermediate shaft 32 through reverse shaft 34 and thereby drive drum 39 in an opposite direction of rotation with respect to drive shaft 23.

As a means for applying a braking action to the gear train described above so as to stop the rotation of drum 39 when the forward and reverse clutches are in neutral, I prefer to employ a braking clutch. This clutch may be of any suitable type such as slidable member 40 slidably keyed to brake-clutch shaft 41 and adapted to rotate therewith, and stationary clutch member 42 adapted to co-act with member 40. Stationary clutch member 42 preferably carries an arm 43 held from rotation by means of stops 44 attached to base 20. The free end of arm 43 is preferably forked as shown in dotted lines in Fig. 3, and is prevented from moving laterally along shaft 41 by means of a bolt 45 carried by stops 44. Such a construction obviates the necessity of nice alignments of the clutch shaft 41 and members 40 and 42 and still provides an effective means for holding clutch member 42 substantially stationary with respect to shaft 41. The braking strain will be carried directly by the base 20 through the stops 44. Shaft 41 is preferably driven by means of intermediate gears 31 through pinion 46. It is obvious that while I show a separate brake-clutch shaft 41, it is not necessary to this invention that such a separate shaft be employed, since my braking device may be applied to any one of the driven shafts. A separate shaft is employed in this preferred construction merely for expediency in design and because it affords a readily accessible means for mounting the governor mechanism which will be described later.

Forward and reverse clutch members 25 and 26 are preferably operated by means of clutch yoke 47 carried by pivoted shaft 48 and adapted to be rotated about its vertical axis by means of arm 49, rod 50, lever arm 51 and control shaft 52 (see Fig. 4). Control shaft 52 is preferably journaled in suitable brackets carried by frame members 21 and 22 and preferably carries manual control lever 53 whereby the shaft may be rotated about its horizontal axis. The brake clutch member is preferably operated by means of yoke 54 pivoted on stationary shaft 55 and adapted to be rotated about shaft 55 by means of link 56, double arm lever 57, rod 58 and arm 59 carried by control shaft 52. Lever 57 is preferably carried by a fixed pivot 60, which may be attached to base 20 in any suitable manner.

As shown in the drawings, the controls are set in neutral. With reference to Fig. 4 it will be seen that link 56 and lever 57 and rod 58 are so arranged that when the control shaft is in neutral, yoke 54 is in its extreme right-hand position. When in this position the brake clutch members are engaged and the brake shaft, intermediate shaft, and consequently the drum, are prevented from rotating. If, however, control shaft 52 is rotated in either direction about this neutral point so as to move yoke 47 either to the right or to the left, yoke 54 will always move to the left, thereby disengaging the brake clutch and leaving the drum free to rotate. It will be seen, therefore, that with my double clutch arrangement operating in combination with my brake clutch, I have provided simple and positive means for operating a winding drum and for preventing said drum from rotating when both the forward and reverse clutches are disengaged.

The control shaft 52 may be operated by means of hand lever 53, preferably rigidly attached thereto, or it may be operated automatically by means of a preferred form of my hydraulic operating mechanism through quadrant 61 and link 62. Quadrant 61 is preferably rotatably mounted on shaft 52 and preferably engages sliding block 63 on lever 53 through notch 64. Block 63 may be operated in any suitable manner such as by rod 65, spring 66, and pivoted hand grip 67 (see Fig. 3). During normal automatic operation block 63 engages notch 64 in quadrant 61 and shaft 52 together with lever 53 are rotated by means of link 62.

My hydraulic operating mechanism preferably consists of an operating cylinder 68 having a double ended piston 69, adapted to operate therein (see Fig. 5). A rocker arm 70, preferably having a fixed pivot 71, carried in any suitable manner by cylinder 68, is preferably employed to connect piston 69 to link 62 which operates quadrant 61. Piston 69 is preferably provided at each end with a working head 72 and 72', each of which heads preferably carries a sliding stem member 73 and 73' attached thereto in any suitable manner and preferably having a fluted cross section as shown in Fig. 8 with the exception of solid portion 79. 74 and 74' designate the cylinder head members for cylinder 68, preferably provided with openings 75 and 75' through which stems 73 and 73' are adapted to project. End-caps 76 and 76' are preferably attached to cylinder heads 74 and 74', serving to enclose stems 73 and 73' when at the outer end of their stroke. Within the cylinder heads and preferably adapted to surround each of the stems are annular valve rings 77 and 77', preferably held apart by means of springs 78'. These rings preferably form a close movable fit about the stems and preferably bear against the inner end of the end-caps 76 and 76' and the shoulder 78 of cylinder heads 74 and 74' respectively, under the action of springs 78'. The function of the inner valve ring 77' is, to co-act with a solid portion 79 (see Figs. 6 and 8) on stems 73 and 73' to close completely openings 75 and 75' at such times when the piston has moved to positions where the solid portions 79 are directly in contact with the rings 77'. By-pass valve openings 80 and 80' are preferably provided in the cylinder heads so as to connect the interior of the cylinder heads with the interior of the cylinder 68 at either end. These by-pass valve openings are preferably controlled by means of adjustable needle valve members 81 and 81' which may be provided with suitable lock nuts 82 for maintaining any desired adjustment. Suitable pipes 83 and 83' are preferably provided and adapted to connect the interior of each of said cylinder heads 74 and 74' with a four-way valve 84. Valve 84 is connected with an inlet pipe 85, a drain pipe 86, and may be provided with a rotary valve member 87, having passages 88 and 89 therein and adapted to connect each of the cylinder head pipes 83 and 83' alternately to the inlet and to the drain. A suitable lever 90 serves to operate the valve member 87.

It will be understood that while I show a valve of the rotary type, I do not limit myself to the use of any particular type of valve or valves for performing these functions.

In operation inlet pipe 85 to four-way valve 84 is connected to a suitable source of fluid under pressure, as will be described later. Drain pipe 86 is connected to any suitable sump or receiving reservoir under atmospheric pressure. With the mechanism in position as shown in Fig. 5 and valve member 87 rotated so as to connect pipe 85 to pipe 83', it will be seen that fluid under pressure will be applied to working face 72' of piston 69 through the fluted passages of stem 73' and through opening 75'. At the same time pipe 83 of cylinder head 74 will be connected to drain pipe 86 and the pressure on working face 72 will be reduced substantially to atmospheric. The piston 69 will therefore be moved to the left (in the figure) the fluid ahead of face 72 being discharged through opening 75, the fluted passages in stem 73 and pipe 83, into drain 86. As piston 69 moves to the left it will rotate control shaft 52 in clock-wise manner through rocker arm 70, link 62, quadrant 61 and lever 53. As shaft 52 is rotated clock-wise, it will disengage reverse clutch members 26 and 28 and move the controls into neutral as shown in Fig. 4, thereby setting brake clutch members 40 and 42 and stopping the rotation of drum 39. Since this action is brought about at a time when the bucket or skip (not shown) operated by the drum is at the top or bottom of its travel and since a certain amount of time is required for the bucket to unload or load (usually from 4 to 10 seconds) it is necessary to retard the action of the piston 69 at this point. The solid portions 79 of the stems 73 and 73' are preferably so placed that when piston 69 has moved the controls into the neutral position, referred to above, they will start to co-act with valve rings 77' to close openings 75 and 75' into the cylinder. In the preferred construction shown, the tension of springs 78' is preferably so adjusted that the pressure of the fluid being forced out of the cylinder will move the ring 77' away from shoulder 78 slightly so as to cause the solid portion 79 to coincide with ring 77', at that end of the piston which is receiving the pressure, slightly in advance of their coincidence at the discharge end. This prevents the building up of a sudden pressure at the discharge end of the piston and insures that the pressure at the pressure end will always be in excess of that at the discharge end. It will be noted in Fig. 5, that ring 77' controlling opening 75 has moved away from shoulder 78 under the action of the outgoing fluid ahead of working head 72. Once the solid portions 79 have moved into coincidence with rings 77' it is evident that no further movement of piston 69 will take place unless pressure be applied in some manner to the working face. This is accomplished by means of the by-pass openings 80 and 80' controlled by needle valves 81 and 81'. By setting these valves at a pre-determined position any amount of fluid desired may be admitted behind the working face of the piston and by this means the piston is kept moving as slowly as is desired until the solid portions 79 have moved past the rings 77'. In Fig. 5 it will be seen that when the solid portion of stem 73' has begun to move into coincidence with ring 77' the opening 75' will be closed against the fluid under pressure. At almost the same time but slightly thereafter, spring 78' will move ring 77' against shoulder 78 of head 74 due to the drop in pressure of the outgoing fluid ahead of face 72. Fluid under pressure will continue to be admitted behind face 72' of piston 69, however, through by-pass opening 80' and fluid will be permitted to escape from in front of face 72 through by-pass opening 80. Piston 69 will continue to move, therefore, but it will move very slowly, the rate of movement being controlled by the needle valves 81 and 81'. After the solid portion 79 on stem 73' has moved past the ring 77' full volume will be admitted behind face 72' through opening 75' and piston 69 will begin to move more rapidly to the left (Fig. 5). At this instant the consequent rise in pressure ahead of face 72 will force ring 77' away from shoulder 78 of cylinder head 74 and opening 75 will be completely uncovered to permit substantially unrestricted flow of fluid out of the cylinder ahead of face 72. As piston 69 moves over into its extreme left-hand position (Fig. 5) control shaft 52 is moved from neutral position further in a clockwise direction, thereby releasing brake clutch members 40 and 42 and engaging forward clutch members 25 and 27, thereby starting the drum 39 to rotate in an opposite direction. When the skip or bucket has reached the end of its travel in this direction, the automatic operating mechanism, which will be described later, moves the lever 90 of valve 84 to the dotted position shown in Fig. 5. This connects the pressure inlet pipe 85 to cylinder head pipe 83 of cylinder head 74 and connects the drain pipe 86 to pipe 83' of cylinder head 74' and piston 69 moves to the right (Fig. 5) until neutral position is reached, when the same operations are performed as described above excepting that they are reversed with respect to directions of motion. It will be understood, of course, that motion of piston 69, once a reverse pressure is applied thereto, from one end position to neutral and from neutral to the other end position in any one direction, is very rapid, and that the retarded motion of the piston through neutral may be made as slowly as desired.

In Fig. 15 I show a modified form of my valve stem 73. In this form I prefer to attach the valve stem to the working face 72 by means of a threaded portion 205 adapted to be screwed into a tapped hole 205' in the working face and held in any desired position by any suitable means such as lock nut 206. It will thus be seen that the relative position of the valve stem may be adjusted with respect to the piston and that the retarding action as described above, due to the co-action of solid portion 79 and valve rings 77' may be made to occur at any desired position of the piston. By providing my valve stems with a plurality of solid portions 79 it is evident that I may secure the above described retarding action at a plurality of positions of the piston. In Fig. 16 I show a form of my valve stem having two such solid portions 79 and it is evident that any number may be employed.

From an examination of Fig. 17 showing a modified form of my valve ring 77', it will be seen that by varying the dimension "X" of the valve ring, I may vary the length of time it will take for solid portion 79 to move past the valve ring and therefore vary the period of retardation of the piston. This would permit a variation of the period of retardation for any given setting of the by-pass valves described above since for any given setting of the by-pass valve, the greater the dimension "X", the greater will be the period of retardation.

While I show a valve ring 77' adapted to co-act with the solid portion or portions 79 on the valve stems, I may eliminate the ring member 77' entirely by proportioning the valve stem and the openings 75 and 75' such that the stem makes a tight moving fit in the opening. Such a construction would operate just as effectively to close openings 75 and 75' at the desired times but would require more accurate machine work in aligning the piston and valve stems with the cylinder heads. The elimination of the valve rings 77' would not, however, make my invention inoperative in any sense.

My preferred means for automatically actuating the four-way valve 84, which controls the operation of the hoist, consists of a threaded lead shaft 91 (Fig. 9) adapted to be operated in any suitable manner from the reverse shaft 34, such as by means of gear 92 meshing with pinion 93 in shaft 34. It will be understood that while I show this lead shaft as being driven by the reverse shaft, it is evident that it may be driven from any one of the driven shafts of the device, it being only necessary that the direction of rotation of the lead shaft be changed whenever the direction of rotation of the winding drum 39 is changed. Lead shaft 91 is preferably provided with a groove or keyway 94 extending its full length and preferably has a rotating disc member 95 slidably keyed thereto operating in keyway 94 so as to rotate with the shaft but capable of lateral movement with respect thereto. As a means for moving rotating disc 95 along shaft 91, I prefer to employ a threaded traveling nut member 96 preferably made in the form of a yoke having two threaded ends 97 and 97' adapted to operate on the shaft 91 at either side of disc member 95. The top of the yoke member 96 is preferably grooved or slotted so as to slide along a guide member 98, thereby preventing member 96 from rotating with shaft 91. It will be seen that as shaft 91 rotates, the threaded ends 97 and 97' of yoke 96 will move the rotating member 95 along the shaft. Trip rollers 99 and 99' are preferably mounted on either side of disc 95 and so positioned as to operate dogs 100 and 100' adjustably positioned on rocker shaft 101. This shaft 101 is preferably rotatably mounted in any suitable manner on the stationary frame members 21 and 22 and is preferably connected to valve lever 90 by means of arm 102 and rod 103. In order to prevent over-running of the apparatus should the rollers fail to operate the dogs 100 and 100' or the valve 84, I prefer to employ a pair of safety dogs 104 and 104' adjustably positioned on over-run shaft 105 such that should roller 99', for example, fail to operate dog 100' it will next strike dog 104' or, in the opposite direction, roller 99 would strike safety dog 104. Over-run shaft 105 is preferably rotatably pivoted at either end in any suitable manner so that when either of the dogs 104 or 104' is struck by the rollers, the shaft will be rotated in such a direction as to lift arm 106 attached to rod 107. Rod 107 is preferably attached to arm 108 carried by trip shaft 109 rotatably pivoted at either end. Arm 110 on shaft 109 is preferably provided with an opening 111 into which end 111' of valve lever 112 is adapted to project. Valve lever 112 is preferably fulcrumed at 113 and preferably carries a weight 114 at or near its free end 115 and between this weight and fulcrum 113 is preferably attached valve rod 116 of release valve 117. This valve is preferably so constructed that should end 111' be released weight 114 will move valve rod 116 downwardly about fulcrum 113 and open the valve thereby releasing the pressure in the hydraulic system. The manner in which the release of the pressure in the hydraulic system will stop the hoisting mechanism, and the piping arrangement of the system will be described later. Valve lever end 111', as explained above, is held within opening 111 of arm 110 by means of an adjustable set screw 118 adapted to bear on the end of the lever when arm 110 is in a vertical position. If arm 110 be rotated downwardly and away from valve 117, the end of the set screw 118 will slide off the end 111' of valve lever 112 and permit the weight to open the valve as described above. It will be seen that arm 110 will always be moved downwardly and in the right direction whenever either one of the safety dogs 104 or 104' is tripped as described above.

In order to prevent the hoisting apparatus from "running away" due to the motive power failing for any reason while the bucket or skip is being hoisted or lowered, I prefer to employ a governor mechanism which may be carried by the brake-clutch shaft and consisting of adjustable governor weights 119. These weights (Fig. 3) are preferably adapted to fly outwardly about pivots 120 against the action of governor springs 120' at a predetermined speed and strike the end of governor lever 121 (Fig. 9) thereby depressing the same. Governor lever 121 is preferably pivoted at 122 and is preferably connected to arm 123 on trip shaft 109 by means of rod 124. It will be seen that as governor lever 121 is depressed by the action of governor weights 119 it will rotate trip shaft 109 and thereby move arm 110 downwardly to release end 111' of valve lever 112 thereby releasing the pressure in the hydraulic system as described above.

The operation of my automatic control mechanism is as follows: If we assume that control piston 69 is in the position shown in Fig. 5, roller 99' on rotating disc 95 has just struck the top of dog 100' so as to rotate shaft 101 in a counter-clockwise direction when viewed from the right-hand end (Fig. 9). This rotation of shaft 101 has moved valve operating lever 90 to the position shown in Figs. 5 and 9 to start piston 69 in its movement towards the left. As explained above, the first effect is to move the controls to neutral position where they are held for a predetermined period of time to permit the bucket or skip to load or unload. When the controls are in neutral the hoist is at rest and, consequently, gear 92, shaft 91, yoke 96 and disc 95 are at rest. As soon as piston 69 passes neutral position it moves to the extreme left-hand position of Fig. 5 as explained above and the hoist is started moving in the opposite direction. Shaft 91 is consequently rotated through gear 92 and rotating disc 95 is moved along shaft 91 under the traveling-nut action of yoke member 96. Disc 95 continues to move to the left (Fig. 9) until roller 99 strikes the top of dog 100 rotating shaft 101 in a clockwise direction and consequently moving valve operating lever 90 to the dotted position shown in Fig. 5 whereupon piston 69 is started moving in the opposite direction. It will be seen that the period of time the hoisting mechanism will run in any one direction is determined by the distance between operating dogs 100 and 100' on shaft 101 and since the relative position of these dogs is adjustable the mechanism may be adjusted for any desired lift. The operation of the "over-run" shaft and dogs and of the governor controlled mechanism for preventing "running away" was described above.

An approved form of my safety mechanism is shown in Figs. 10, 11, and 12. A cylinder member 125 preferably supported in any suitable manner on base 20 is preferably provided with a head member 126 having an opening 127 therein adapted to be connected to the source of fluid pressure by means of pipe 128 as will be described more fully later. A tubular member 129 is preferably provided at the other end of cylinder 125 and preferably carries a telescoping cap 130 adapted to make a close fit with the outside surface of member 129 but capable of lateral movement with respect thereto. Cap 130 is preferably provided with lugs 131 at either side adapted to take the threaded ends of bolts 132. The heads of bolts 132 are preferably adapted to bear against flange 133 of head 126 and the function of these bolts is to maintain the relative position of cap 130 and member 129. It will be seen that as bolts 132 are screwed into lugs 131 cap 130 will be moved to the left along member 129 (Fig. 10) thereby serving as a simple and positive means for adjusting the compression of a resilient member, such as spring 134 adapted to operate within the chamber 135 formed by member 129 and the inner surface of cap 130. Spring 134 is adapted to operate between the inside end of cap 130 and a piston 136 to force the piston to the left in cylinder 125 (Fig. 11). Piston 136 preferably carries a piston rod 137 which projects through opening 138 in cap 130 and is preferably supported at its free end by means of any suitable bearing member 139. The compression of spring 134 is preferably so adjusted by means of bolts 132, that when the fluid pressure within cylinder 125 ahead of piston 136 falls below a pre-determined value, the spring will move the piston 136 and rod 137 to its extreme-head-end position shown by dotted lines in Fig. 11. The compression is such, however, that when the fluid pressure in the hydraulic system reaches a pre-determined value, the consequent pressure upon piston 136 through the agency of pipe connection 128 will force the piston to the right against the pressure of spring 134 to the position shown in full lines in Fig. 11.

Piston rod 137 preferably has a cross head 140 attached thereto in any suitable manner and adapted to carry pivot pins 141. Rods 142 are preferably attached to cross head 140 by means of the pins 141 and are preferably provided at their opposite ends with slotted members 143 within which rollers 144 at either end of double-ended lever 145 are adapted to operate. Lever 145 is preferably rotatably mounted on control shaft 52 and is preferably adapted to be connected to this shaft by means of a slidable clutch member 147 (see Fig. 4) keyed to the shaft and adapted to coact with clutch member 148 which may be made integral with the hub of the lever 145. It will be seen that when clutch members 147 and 148 are engaged as shown in Fig. 4, any rotation of lever 145 will rotate control shaft 52. As a means for disengaging lever 145 from shaft 52, as when it is desired to control the hoist manually with no hydraulic pressure in the system, I prefer to provide a clutch yoke 149 of any suitable type pivoted at 150 and operated by means of rod 151 and lever 152 pivoted at 153. A spring 154 adapted to operate between a fixed member 155 and shoulder 151' preferably serves to keep clutch members 147 and 148 engaged except at such times when lever 152 is depressed.

The operation of my approved form of safety device will be readily seen by an examination of Figs. 11, 12, and 4. When the hoist is operating normally and full pressure is maintained in the hydraulic system piston 136 and rod 137 will occupy substantially the position shown in Fig. 11. Rods 142 will therefore have substantially the position shown with respect to lever 145 and it will be seen that, due to pivoted mountings of rods 142 and the length of the slots in members 143, lever 145 may be rotated either clockwise or counter-clockwise with control shaft 52 during normal operation of the hoist. This is shown by the dotted positions of lever 145 in Fig. 11. Should the hydraulic pressure in the system fall below a pre-determined pressure, however, for any reason, spring 134 will move piston 136 and rod 137 to the left in Fig. 11 until slotted members 143 have reached the position with respect to lever 145 and rollers 144, shown in Fig. 12. It will be seen that due to the fact that cross head 140 is rigidly held on rod 137, the effect of the left-hand movement of rod 137 will always be to move lever 145 to the vertical position shown. This is evident from an examination of the dotted positions of lever 145 shown in Fig. 12. Any other position of lever 145 than the one shown in full lines would evidently require either a pivoted movement of collar 140 on rod 137 or a shortening of one of the rods 142 and a lengthening of the other rod 142. Since the construction is such as to make this impossible, it will be seen that the effect of a drop in pressure in the hydraulic system will always move lever 145 to a vertical position. Since lever 145 is preferably so connected to control shaft 52 that when the lever is in a vertical position the shaft is so set that all controls are in neutral, it is evident that a drop in pressure in the hydraulic system, for any reason, will immediately and automatically set all controls in neutral and stop the hoist. Should it be desired to control the hoist manually and without the hydraulic system, it is only necessary to depress lever 152 which releases the clutch members 147 and 148 when the control shaft 52 may be operated by means of the hand lever 53.

A preferred arrangement of my hydraulic system is shown in Fig. 13. In this figure 156 denotes a pump of any suitable type adapted to be driven from drive shaft 23 by means of pinion 157 and gear 158 (see Fig. 1). Pump 156 is preferably connected at its suction side by means of pipe 159 to fluid reservoir 160. The pressure side of pump 156 is preferably connected by means of pipe 161 to the pressure pipe 85. Pipe 85, as described above, is preferably connected at one end to four-way control valve 84, and it is preferably connected at the other end to the base 162 of an accumulator (see Fig. 14), whose function it is to maintain a constant pressure in the hydraulic system. My accumulator preferably consists of base member 162 having a pressure chamber 163 therein and having a stand pipe member 164 attached thereto in any suitable manner. A sleeve member 165 preferably fits over member 164 (Fig. 14) and is preferably closed at the upper end by means of cap 165'. Sleeve member 165 is preferably movable with respect to member 164 and its lower end preferably carries any suitable form of stuffing box 166 for the purpose of preventing leakage between members 164 and 165. Member 165 preferably carries a weight 167. A rod 168 adjustably attached to cap 165' preferably projects downwardly into member 164 and through an opening in cap 169 of hollow valve stem 170 and preferably terminates in an enlarged portion 171 which is too large to pass through the opening in cap 169. Valve stem 170 preferably carries valve 172 at its lower end, held against valve seat 173 by the weight of stem 170 and the fluid pressure. A guide member 174 attached to the lower end of valve 172 insures correct seating of this valve. Valve 172 preferably controls outlet chamber 175 connected to fluid source 160 by means of drain pipe 86 and pipe 176.

A spring 176' at the upper end of stand-pipe member 164 (Fig. 14) serves to act as a cushion for member 165 and weight 167 when the latter are lowered due to drop in pressure in the system.

In operation it will be seen that as pump 156 begins to function, fluid will be pumped from reservoir 160 through pipes 161 and 85 into pressure chamber 163 of the accumulator. This pressure will raise sleeve member 165, weight 167 and valve operating rod 168 until portion 171 contacts with cap 169 and opens outlet valve 172 thereby causing the pressure to drop until the rod 168 is lowered sufficiently to permit the valve 172 to close. The result is a constant pressure in the pipe 85 insured by the weight 167 and the open-and-closed action of valve 172 which limits the upward movement of the weight.

Pressure pipe 85 is preferably connected to a safety pressure system 177 by means of a feeder pipe 178 and cut-off-pressure pipe 179. Piping 177 is preferably connected to pressure release valve 117 at one end and at the other end to each end of operating cylinder 68 through one-way check valves 178' so that if for any reason the pressure at either end of piston 68 rises momentarily above the normal pressure in the system, this increase in pressure will be relieved through these check valves and fluid will flow from the cylinder into the safety pressure system until normal pressure is restored. Pipe 128 to safety cylinder 125 is preferably connected to pipe 177 as shown so that cylinder 125 will be at normal operating pressure at all times, as described above. Pressure release valve 117 is preferably connected at its outlet opening (not shown) to drain pipe 86 by means of pipe 86' so that if valve 117 is opened, as explained above, the pressure in pipe 177, and consequently in pipe 85, will drop to atmospheric and the safety cylinder 125 will return all controls to neutral and stop the hoist. Pipe 86' provides for the return of fluid to the system through pipes 86 and 176.

As a means for cutting-off the pressure to the control valve 84 and, consequently, the control cylinder 68, immediately the pressure release valve 117 operates, I prefer to insert a cut-off valve 180 in the pressure pipe 85. Valve 180, which may be of any suitable construction, is preferably controlled by means of a stem 181, lever 182 pivoted at 183 and attached at 184 to a plunger rod 185. A suitable adjusting weight 186 is also preferably provided attached to the free end of lever 182. Plunger rod 185 is preferably operated by any suitable form of plunger (not shown) working in cylinder 187 and connected to the safety pressure system through pipe 179. It will be seen that as the fluid pressure is built up in the pressure and safety pressure systems, the plunger (not shown) in cylinder 187 will be forced upwards, under the action of this hydraulic pressure, thereby opening valve 180 against the action of weight 186. As soon, however, as pressure release valve 117 releases the pressure in the system, weight 186 will close valve 180, thereby permitting the pressure in both ends of cylinder 68 to drop to atmospheric. Thus when safety cylinder 125 returns the controls to neutral it will not have to move piston 69 against a pressure and the setting will not be retarded.

In operation it will be seen that as soon as pump 156 is operated it will begin to build up a fluid pressure in the main pressure pipe 85 and safety pressure pipe 177, which pressure is maintained at substantially a constant value by means of the accumulator. As soon as this fluid pressure is built up, cut-off valve 180 opens and the mechanism is ready for operation. If, for any reason, release valve 117 is tripped the pressure in the safety system will at once fall to zero, cut-off valve 180 will close and safety cylinder 125 will act to set the controls in neutral and stop the hoist. The hoist cannot be controlled again by means of the hydraulic system until release valve 117 is set by hand in its closed position and until the fluid pressure has had sufficient time to re-set safety cylinder 125 in its normal running position through the restricted feeder pipe 178, and open cut-off valve 180. It will be seen, therefore, that I have provided a hoisting mechanism which may be operated either manually or automatically as desired, and which is safe, reliable and practically "fool proof" in its operation.

I claim:

1. In a winding mechanism, a driving shaft, a driven shaft, means for connecting said driving and driven shafts, a brake clutch and fluid actuated means for operating said brake clutch in timed relation with said mechanism and connecting means whereby said brake clutch will stop the rotation of said driven shaft whenever said connecting means are disengaged.

2. In a winding mechanism, a control yoke adapted to occupy a neutral position to make said mechanism inoperative, fluid-actuated means for moving said control yoke in either direction from said neutral position, a brake-yoke and operating means therefor whereby said brake yoke will be moved to a given position whenever said control yoke is moved away from said neutral position and will be moved to another position whenever said control yoke is moved towards said neutral position.

3. In a winding mechanism, a forward clutch, a reverse clutch, a brake clutch, a clutch control shaft, and hydraulically actuated means connected to said shaft for selectively operating said clutches in timed relation to each other and to said mechanism.

4. In a winding mechanism, in combination with a forward clutch, a reverse clutch, a brake clutch and a clutch control shaft therefor, and automatic hydraulically controlled means for operating said control shaft in predetermined operative sequence with respect to said winding mechanism.

5. In a winding device, a brake clutch, a control mechanism operatively associated with said clutch, and hydraulically operated automatic means for operating said mechanism to effect a predetermined sequence of control of said winding device.

6. In a winding mechanism, a frame therefor having brake stop plates thereon, a shaft, a braking device for said mechanism comprising a member adapted to rotate with said shaft and a member rotatably mounted on said shaft, means for holding said second member stationary with respect to said shaft, comprising an arm carried by said shaft and having its free end adapted to contact with said stop plates whereby the braking strain will be carried by said frame.

7. In a winding mechanism including a hydraulic control-operating device and a valve therefor, a rotatable shaft, a member adapted to travel along said shaft, and a pivoted lever adapted to be engaged by said member for controlling said valve at a predetermined position of said member on said shaft.

8. In a winding mechanism including a hydraulic control-operating device and a valve therefor, a rotatable shaft, a rotatable member adapted to travel along said shaft, and adjustable means for controlling said valve at a predetermined position of said member on said shaft.

9. In a winding mechanism, a control shaft, operating members adjustably positioned on said shaft, a threaded lead shaft disposed in parallel adjacence to the control shaft, and adapted to be rotated by said mechanism, an element operatively secured to, and adapted to rotate with said lead-shaft, and threaded means coacting with the threaded portion of the lead shaft for moving said element along said lead-shaft to trip said members.

10. In a winding mechanism, fluid pressure control means associated therewith, including a plurality of valves, a pair of rocker shafts, operating members on said shafts, adapted selectively to actuate said valves, a lead-shaft adapted to be rotated by said mechanism, an element adapted to rotate with said lead-shaft, and a yoke on said lead-shaft and adapted to contact with said element whereby said element may be moved in either direction along said lead-shaft to operate said members.

11. In a winding mechanism, a shaft adapted to be rotated thereby, a member adapted to travel on said shaft, a means for controlling a valve at a predetermined position of said member on said shaft, and a safety release mechanism adapted to operate upon the failure of said means to operate.

12. In an automatic reversible hoist having a hydraulic control system, the combination of a shaft, a member adapted to travel on said shaft, a valve adapted to be controlled by said member at a predetermined position of said member on said shaft, and a governor controlled means adapted independently to operate said valve.

13. In a winding mechanism the combination of a shaft adapted to be rotated thereby, a member adapted to travel on said shaft, a means adapted to control a valve at a predetermined position of said member on said shaft, a safety release mechanism adapted to operate upon the failure of said means to operate, and independent governor controlled means adapted to operate said safety release mechanism.

14. In a winding mechanism, a fluid control system comprising a control operating device, a valve therefor, a safety device adapted to control said mechanism upon a predetermined variation of pressure in said control system, an automatic pressure release valve, a fluid pressure maintaining means and a fluid circulating means, said operating device, the valve therefor, said safety device, release valve, pressure maintaining means and circulating means being hydraulically interconnected, and said system being adapted to effect a predetermined sequence of control over said mechanism.

15. In a winding mechanism interchangeably adapted for full automatic hydraulic control and for manual control, a fluid control system for such hydraulic control comprising in combination, a control operating device, an operating valve and a pressure cut-off valve therefor, a safety device adapted to control said mechanism upon a predetermined variation of pressure in said control system, an automatic pressure release valve for said system, a fluid pressure maintaining means, a fluid circulating means and a hydraulic connection between said operating device, its operating and cut-off valves, said safety device, release valve, pressure maintaining means and circulating means.

16. In a winding mechanism, a fluid control system comprising a fluid motor for operating the controls of said mechanism, a control valve and a pressure cut-off valve for said motor, a safety actuating device adapted to control said mechanism upon a predetermined variation of pressure in said control system; said motor and safety device being connected to a common control shaft; an automatic pressure release valve for said system, a hydraulic accumulator and a pump; said motor, motor valves, safety device, release valve, accumulator and pump being hydraulically interconnected.

17. In a winding mechanism, a control-yoke adapted to be rotated in a given arc about a fixed axis, in either direction from a predetermined neutral position, a brake-yoke adapted to be rotated in a given arc about a fixed axis, and interconnected operating means including a rotatable shaft for conjointly actuating said yokes whereby said brake-yoke will be rotated in a given direction whenever said control-yoke is rotated away from said neutral position and will be rotated in the opposite direction whenever said control-yoke is moved towards said neutral position.

18. In a winding mechanism, a forward clutch, a reverse clutch, and a control-yoke therefor, said clutches being so positioned that when one clutch is engaged the other is disengaged, operating means for said control-yoke whereby said yoke may be moved from a neutral position to engage one of said clutches, and may be moved in an opposite direction from said neutral position to engage the other of said clutches; a brake clutch, a brake-yoke therefor, and brake-yoke operating means whereby said brake-yoke will be moved to effect engagement of said brake clutch whenever said control yoke is moved to neutral position, and will be moved to disengage said brake clutch whenever said control yoke is moved from said neutral position.

19. In a winding mechanism, a valve control rocker-shaft, a plurality of operating dogs on said shaft and adjustably spaced with respect to each other, a lead-shaft adapted to be rotated by said mechanism, a disc slidably mounted on said lead-shaft and keyed to the lead-shaft to rotate therewith, a traveling yoke in threaded engagement with said lead-shaft and adapted to move said disc along the shaft, means on said disc for operating said dogs, and stationary guide means adapted to contact with said yoke to prevent rotation thereof.

20. In a winding mechanism, a rocker-shaft, operating dogs adjustably positioned on said rocker-shaft, a lead-shaft substantially parallel to said rocker-shaft and adapted to be rotated by said mechanism, a disc slidably mounted on said lead-shaft and adapted to be rotated thereby, means for moving said disc along the lead-shaft between said dogs, means on the disc for tripping said dogs whereby the limit of travel of said disc along said lead-shaft is determined in either direction.

21. In a winding mechanism, a rocker-shaft, operating dogs adjustably positioned on said rocker-shaft, a lead-shaft substantially parallel to said rocker-shaft and adapted to be rotated in alternately opposite directions by said mechanism, a disc slidably mounted on said lead-shaft and adapted to rotate therewith, a traveling yoke on said lead-shaft and adapted to move said disc along the lead-shaft between the operating dogs, means on the disc for tripping the operating dogs whereby the normal limit of travel of the disc along the lead-shaft is determined in either direction, an over-run shaft substantially parallel to said lead-shaft, and an operating dog adjustably positioned on said over-run shaft at a predetermined distance beyond each end of the travel of said disc.

FREDERICK N. WHITESELL.